(12) United States Patent
Cohen

(10) Patent No.: US 9,811,700 B2
(45) Date of Patent: Nov. 7, 2017

(54) FRACTAL PLASMONIC SURFACE READER ANTENNAS

(71) Applicant: Fractal Antenna Systems, Inc., Bedford, MA (US)

(72) Inventor: Nathan Cohen, Belmont, MA (US)

(*) Notice: Subject to any disclaimer, the term of this patent is extended or adjusted under 35 U.S.C. 154(b) by 0 days.

(21) Appl. No.: 15/348,647

(22) Filed: Nov. 10, 2016

(65) Prior Publication Data

US 2017/0061176 A1 Mar. 2, 2017

Related U.S. Application Data

(63) Continuation-in-part of application No. PCT/US2015/065162, filed on Dec. 11, 2015.

(60) Provisional application No. 62/178,357, filed on Apr. 8, 2015, provisional application No. 62/379,989, filed on Aug. 26, 2016.

(51) Int. Cl.
*H01Q 9/40* (2006.01)
*G06K 7/10* (2006.01)

(52) U.S. Cl.
CPC ..... *G06K 7/10366* (2013.01); *G06K 7/10316* (2013.01)

(58) Field of Classification Search
CPC combination set(s) only.
See application file for complete search history.

(56) References Cited

U.S. PATENT DOCUMENTS

| 6,204,764 | B1* | 3/2001 | Maloney | G06K 17/00 235/375 |
|---|---|---|---|---|
| 7,256,751 | B2 | 8/2007 | Cohen | |
| 8,253,639 | B2 | 8/2012 | Cohen | |
| 2007/0008155 | A1* | 1/2007 | Trost | A01K 11/007 340/573.3 |
| 2011/0063189 | A1 | 3/2011 | Cohen | |
| 2012/0038515 | A1 | 2/2012 | Truitt et al. | |
| 2014/0090828 | A1* | 4/2014 | Cohen | F28F 7/00 165/185 |

OTHER PUBLICATIONS

International Search Report and Written Opinion issued in corresponding application No. PCT/US2015/065162 dated Mar. 31, 2016, 13 pages.

* cited by examiner

*Primary Examiner* — Brian Zimmerman
*Assistant Examiner* — Cal Eustaquio
(74) *Attorney, Agent, or Firm* — McDermott Will & Emery LLP; G. Matthew McCloskey

(57) ABSTRACT

Plasmonic-surface antenna systems are described in which resonators, or cells, are closely arranged but do not touch. At least a portion of a radiating surface includes a plurality of cells (operative as resonators) placed very close together to one so that a surface (plasmonic) wave causes near replication of the current of one cell in an adjacent cell. Cells with one or more fractal shapes may be used as a fractal plasmonic surface (FPS). Systems and/or methods are described of using plasmonic surfaces or fractal plasmonic surfaces for radiofrequency identification (RFID). A PS or FPS may act as an intermediary array of antennas, which can serve to connect an RFID reader with one or more RFID tags. Structures including cages are described that can include one or more surfaces that are each an FPS. Methods of power transfer are described.

5 Claims, 5 Drawing Sheets

Columns

Rows

FRACTAL PLASMONIC SURFACE READER ANTENNAS

CROSS-REFERENCE TO RELATED APPLICATION

This application is a continuation-in-part of International Application No. PCT/US15/65162, filed 11 Dec. 2015 and entitled "Fractal Plasmonic Surface Reader Antennas," which application claims priority to and the benefit of U.S. Provisional Application No. 62/178,357, filed 8 Apr. 2015 and entitled "Fractal Plasmonic Surface Reader Antennas"; this application also claims priority to and the benefit of U.S. Provisional Application No. 62/379,989, filed 26 Aug. 2016 and entitled "Meta-Material Based Localization System"; the entire content of all of which applications is incorporated herein by reference.

BACKGROUND

Radio-frequency identification (RFID) systems commonly use tags, or labels attached to the objects for identification of those objects. For such systems, two-way radio transceivers, also referred to as interrogators or readers, send a signal to the tag and read its response.

RFID tags can be passive, active or battery-assisted passive. An active tag has an on-board battery and periodically transmits its ID signal. A battery-assisted passive RFID tag can have a small battery and is activated when in the presence of an RFID reader. A passive tag is typically cheaper and smaller because it has no battery; instead, the tag uses the radio energy transmitted by the reader. However, to operate a passive tag, it must be illuminated with a power level roughly a thousand times stronger than for signal transmission. That makes a difference in interference and in exposure to radiation.

Tags may either be read-only, having a factory-assigned serial number that is used as a key into a database, or may be read/write, where object-specific data can be written into the tag by the system user. Field programmable tags may be write-once, read-multiple; "blank" tags may be written with an electronic product code by the user.

RFID tags typically contain at least two parts: an integrated circuit for storing and processing information, modulating and demodulating a radio-frequency (RF) signal, collecting DC power from the incident reader signal, and other specialized functions; and an antenna for receiving and transmitting the signal. The tag information is stored in a non-volatile memory. The RFID tag includes either fixed or programmable logic for processing the transmission and sensor data, respectively.

An RFID reader transmits an encoded radio signal to interrogate the tag. The RFID tag receives the message and then responds with its identification and other information. This may be only a unique tag serial number, or may be product-related information such as a stock number, lot or batch number, production date, or other specific information. Since tags have individual serial numbers, the RFID system design can discriminate among several tags that might be within the range of the RFID reader and read them simultaneously.

RFID systems can be classified by the type of tag and reader. A passive-reader active-tag system has a passive reader which only receives radio signals from active tags (e.g., battery operated, transmit only). The reception range of a passive-reader active-tag system reader can be adjusted, e.g., from 1-2,000 feet (0-600 m), allowing flexibility in applications such as asset protection and supervision. An active-reader passive-tag system has an active reader, which transmits interrogator signals and also receives authentication replies from passive tags. An active-reader active-tag system employs active tags which are awaken with an interrogation signal from an active reader. A variation of this system could also use a battery-assisted passive tag which acts like a passive tag but has a small battery to power the tag's return reporting signal.

Fixed readers are typically set up to create a specific interrogation zone which can be tightly controlled. This allows a highly defined reading area for when tags go in and out of the interrogation zone. Mobile readers may be handheld or mounted on carts or vehicles.

Active tags may contain functionally separated transmitters and receivers, and the tag need not respond on a frequency related to the reader's interrogation signal. An Electronic Product Code (EPC) is one common type of data that may be stored in a tag.

Often more than one tag will respond to a tag reader, for example, many individual products with tags may be shipped in a common box or on a common pallet. Collision detection is important to allow reading of data. Two different types of protocols are often used to "singulate" a particular tag (i.e., differentiate it from other nearby tags), allowing its data to be read in the midst of many similar tags. In a slotted-ALOHA system, the reader broadcasts an initialization command and a parameter that the tags individually use to pseudo-randomly delay their responses. When using an "adaptive binary tree" protocol, the reader sends an initialization symbol and then transmits one bit of ID data at a time; only tags with matching bits respond, and eventually only one tag matches the complete ID string.

Prior RFID systems have presented drawbacks when used with many tags or with multiple overlapping readers. Additionally, prior RFID systems have encountered difficulties when an RFID reader has attempted to read one or more RFID tags contained within an enclosure or structure. Problems may in particular arise if the enclosure or structure is made with metallic structure(s) or elements, which can scatter or reflect incident RF energy from the reader or prevent reception by the RFID tags due to the structure(s) or elements acting as a Faraday cage.

SUMMARY

An aspect of this disclosure is directed to plasmonic-surface antenna systems in which resonators, or cells, are closely arranged but do not touch. At least a portion of a radiating surface includes a plurality of cells (operative as resonators) placed very close together to one so that a surface (plasmonic) wave causes near replication of the current of one cell in an adjacent cell.

In exemplary embodiments, cells with one or more fractal shapes may be used as a fractal plasmonic surface (FPS).

A further aspect of this disclosure is directed to systems and/or methods of using fractal plasmonic surfaces for radiofrequency identification (RFID). A FPS may act as an intermediary array of antennas, which can serve to connect an RFID reader with one or more RFID tags.

In exemplary embodiments, a structure can include one or more surfaces that are each an FPS.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

An aspect of the present disclosure, describing the subject technology, is directed to novel antenna systems where at least a portion of a radiating surface is includes a plurality of cells (as resonators) placed very close together to one another (e.g., less than 1/20 wavelength for a desired or nominal operational wavelength) so that a surface (plasmonic) wave causes near replication of the current in one cell in an adjacent cell. These surfaces are referred to herein as plasmonic surfaces (PSs). The cells may lie or be formed on or in a flat or curved surface (e.g., a sheet). In some embodiments, the cells may be configured in layers for wide-bandwidth or multibandwidth operation. The area of the sheet and its number of cells determines the gain relative to a single cell. As each cell is fed plasmonically rather than directly, 'dead' or covered or out of resonance cells do not alter the ability of the other cells to work. The boundary edges of the surface may, as an option, be terminated resistively (e.g., may be bounded by or in contact with resistive material) so as to not degrade the cell performance at the edges. The individual cells of a PS do not have to formed closed shapes of conductive paths (or traces). For example, in some embodiments, arrays of split-ring resonators may be used.

Figure 1:
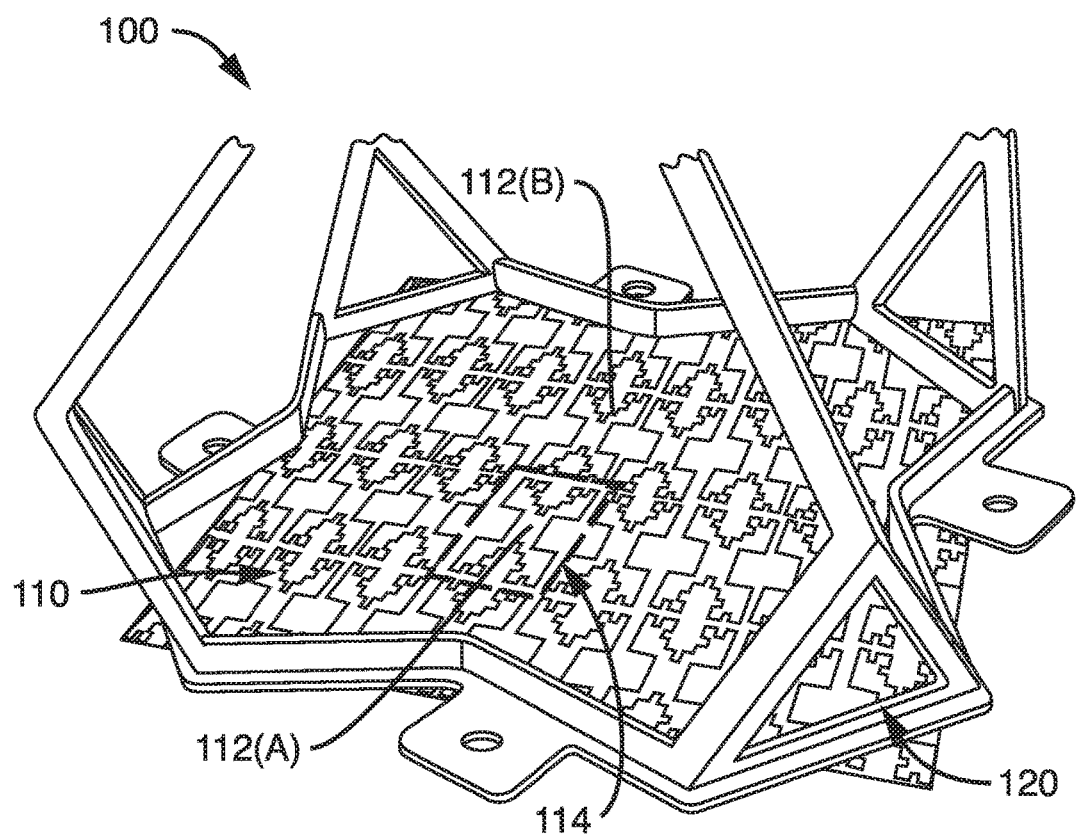
FIG. 1 shows an example of a fractal plasmonic surface (FPS) antenna system according to the present disclosure.

In exemplary embodiments, the cells of a PS may be fractal cells (small fractal shapes), in which case the related surface may be referred to as a fractal plasmonic surface (FPS). A fractal may have two or more iterations (also referred to as "orders") of a basic "generator" shape. The fractals may lie on a flat or curved sheet and be configured in layers for wide-bandwidth or multibandwidth operation. At least some portions of at least one of the cells may be self-similar to some degree, or the array of cells can show some degree of self-similarity. Alternatively or additionally, any space-filling or multiple-level antenna design may be used for at least one cell. A PS or FPS surface can, in some embodiments, be embedded into a dielectric material, e.g., plastic, and preferably (but not necessarily) be hidden inside that material. FIG. 1 shows a cut away cage with the invention shown without a covering. Any suitable fractal shape may be utilized for a cell. Examples include but are not limited to shaped as a portion of a Sierpinski triangle or sieve (gasket), a Sierpinski carpet (square) or portion of, including any type or variation, a substantially thicker version of the Sierpinski carpet including a section of a Menger sponge of any type or variation, a Koch curve, including a so-called "delta" fractal, which is a 3D extrapolation of a Koch curve, a section of a Keplerian fractal, and any other suitable 2D or 3D fractal or fractal-like shape.

FIG. 1 shows an example of a fractal plasmonic surface (FPS) antenna system 100 according to the present disclosure. As shown, system 100 can include a FPS 110 having a plurality of cells 112A-B, a representative one of which is shown inside of box 114. The cells 112A-B are each shown formed as a conductive trace having a closed fractal shape, and are on a surface of a printed circuit board; all of which form the FPS 110. FPS 110 is shown mounted to a space frame 120, which can have any desired shape, including for a cage or other enclosure. While FPS 110 is shown without a covering, any suitable covering material may be used. Further, FPSs could be mounted to other portions of space frame 120. Any suitable method can be used to form the cells. Examples may include but are not limited to printing, masking, lithography, immersion, and other known printed circuit board manufacturing techniques. Exemplary embodiments, e.g., those for which it is desirable for the cells to have significant vertical relief, can utilize 3D printing. The conductive traces (paths) may be made of any suitable material(s). Examples may include but are not limited to copper, silver, gold, platinum, palladium, iridium, alloys of those metals, any of the various phases of those metals and alloys, including nano-ribbons, and the like Suitable conductive inks may be used for the traces in some embodiments.

In some embodiments, such as described in more detail below for FIG. 2, a fractal plasmonic surface (FPS) may be a surface layer or sheath used to cover (a portion or entirety of) an object or structure or embedded in an object (e.g., a shelf, wall, etc.) or structure.

Figure 2:
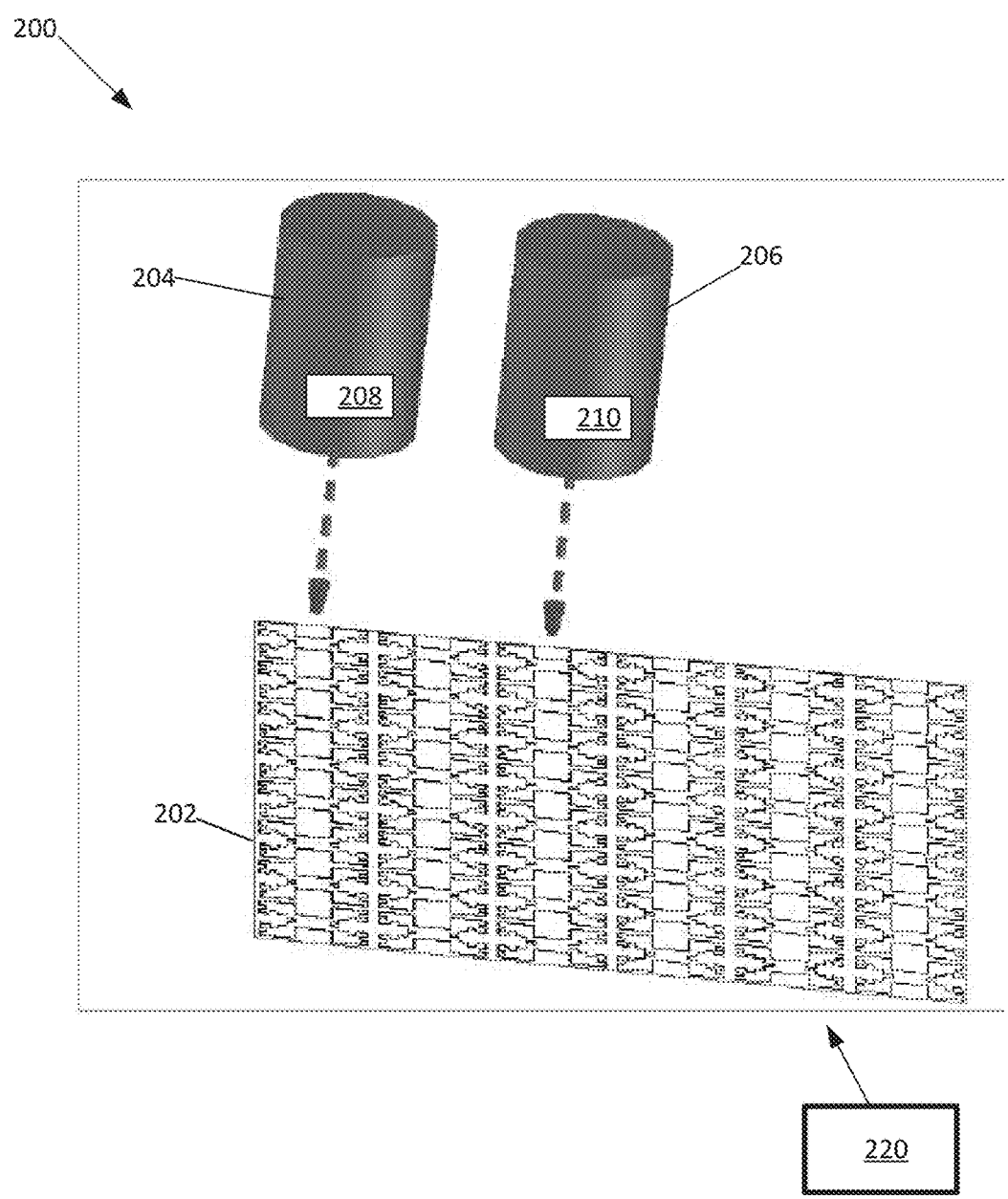
FIG. 2 depicts an embodiment of a fractal plasmonic surface (FPS) RFID system, in accordance with the present disclosure.

FIG. 2 depicts an embodiment of a fractal plasmonic surface (FPS) RFID system 200, in accordance with the present disclosure. System 200 includes a FPS 202 composed of a number of closely-packed fractal cells as shown. Two cans 204, 206 are shown adjacent to FPS 202, which may itself have sufficient structural rigidity to support the cans 204, 206; or, FPS 202 may be supported by another structures such as a shelf (not shown). As shown, each can 204, 206 has a RFID tag 208, 210, respectively, placed on it.

System 200 can also have a RFID reader shown as 220. RFID reader 220 can read RFID tags 208, 210 when sufficiently close to any portion of FPS 202. Any RF energy produced by RFID reader 220 and incident on FPS 202 can travel, across or through the close-packed array of cells of FPS 202, to RFID tags 204, 206 for reading. Each RFID tag 204 or 206 may be active or passive. Of course, while system 200 has been described as employing an active RFID reader, passive RFID readers may also be used with FPS 202 (and with active tags).

Due to the electrical connection (direct or indirect or passive) between the cells of FPS 202, the cell ensemble acts as an array of individual 'read' antennas for RFID readers or other 'reader' like devices. To wit: if a product is placed on this shelf of FIG. 2, for example, and it has an RFID tag, a nearby cell can 'read' the tag; another product on the shelf at a different place can be read by a different cell. That cell may not need to by physically attached directly-electrically to another cell. The system can also be used in wall units for reading ID tags, for example.

Embodiments of the present disclosure can provide RFID readers or RFID-reading capability for structures, e.g., cages, stalls, rooms or other enclosures, by including a FPS on (directly or indirectly) or in such structures. By providing such a structure with a FPS, a RFID reader can make use of the FPS as an intermediary array of read antennas. This can extend the range that the RFID reader can read an RFID tag that is inside or near to the structure. One result afforded by this arrangement is that a RFID reader can read a RFID tag placed on or in something that is inside or near such a structure, with the reading being done at an extended rage (physical distance between the RFID reader and the RFID tag) compared to the situation with the FPS absent.

Exemplary embodiments and applications of the subject technology can include one or more PSs or FPSs used with cages for laboratory animals, e.g., rats, mice, guinea pics, etc. An RFID reader (or, "interrogator") is enabled by the FPS to read information gathered from the RFID tag within or adjacent to such a structure (e.g., cage). For such applications, the RFID tag (or, "label") can include any suitable or desired information associated with the animal(s), e.g., the number and times of feedings, whether the laboratory animal has had or needs to have medicine(s) administered, and if so, the actual or indicated dosage(s), data associated with observed urinary tract or bowel function, etc.

Figure 3:
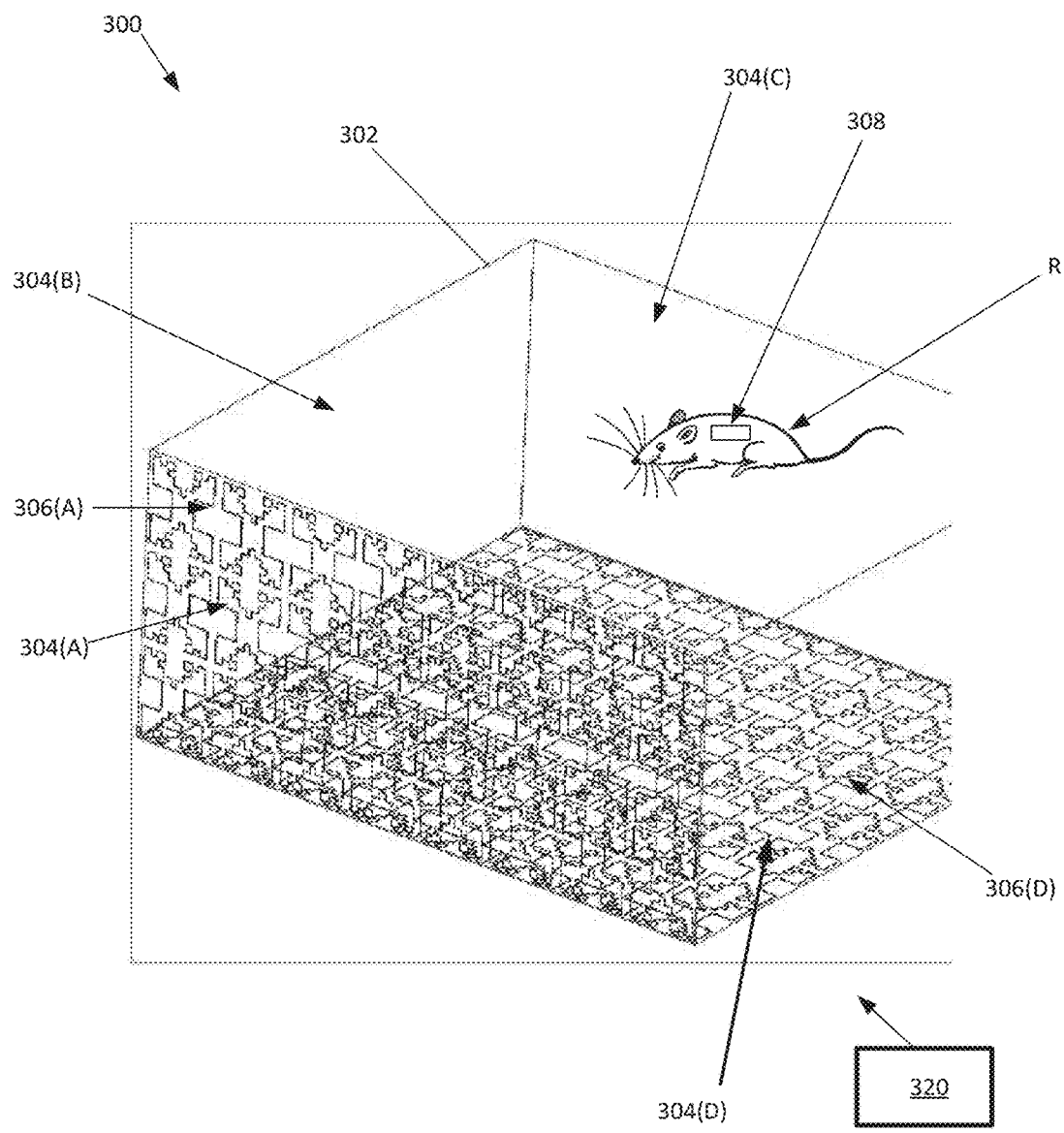
FIG. 3 depicts an embodiment of a RFID system employing FPSs configured as a cage for a laboratory animal, in accordance with the present disclosure.

FIG. 3 depicts an embodiment of a RFID system 300 employing FPSs configured as a cage for a laboratory animal. System 300 can include a frame 302, e.g., having a rectangular outline with a number of faces, e.g., 304(A)-304(D), etc. One or more FPSs can be mounted to the frame 302, e.g., as shown by 306(A) and 306(D). Of course, while a frame is shown in FIG. 3, no frame is required and the FPSs can be mounted directly to each other and/or to other structures. The frame and faces can form a cage for a laboratory animal, as indicated by representative rat, R. A RFID tag 308 can be placed within or on the animal, e.g., by surgical implantation. System 300 of FIG. 3 can include an RFID reader/writer, as shown by 320, which is operative to read RF energy from RFID tag 308.

Figure 4:
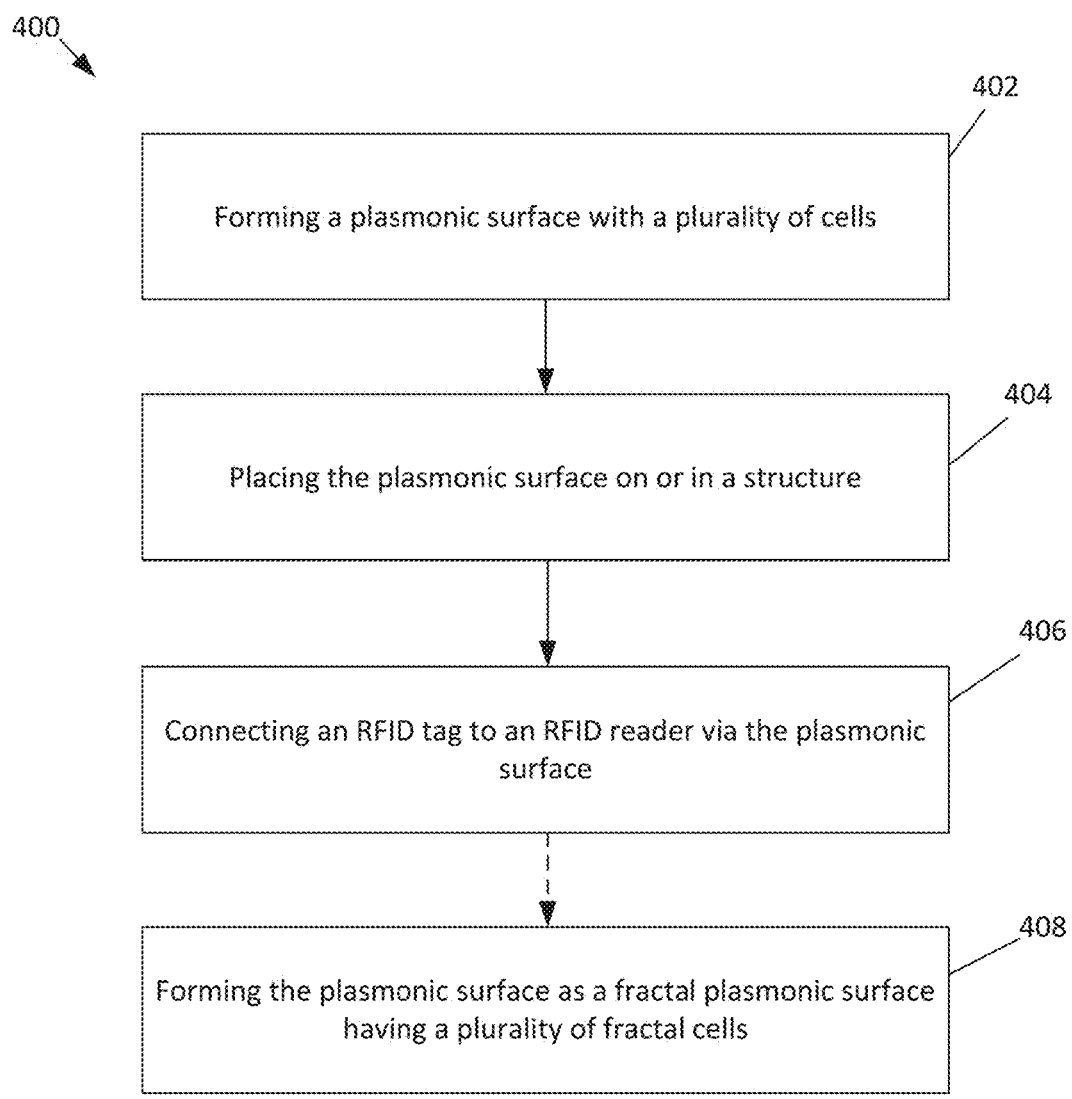
FIG. 4 depicts an example of a method of making a plasmonic-surface-based RFID system according to the present disclosure.

FIG. 4 depicts an example of a method 400 of making a plasmonic-surface-based RFID system according to the present disclosure. As shown at step 402, a plasmonic surface can be formed with a plurality of cells. The plasmonic surface can be placed on or in a surface of a structure, as shown at step 404.

Continuing with the description of FIG. 4, the method 400 can also include using the plasmonic surface with a RFID reader and a RFID tag. For example, step 406 indicates connecting an RFID tag to an RFID reader via the plasmonic surface. As described above, RF energy travels from the RFID reader to the RFID tag (or vice versa) via plasmonic coupling between the cells of the plasmonic surface. For exemplary embodiments, the plasmonic surface may be formed as a fractal plasmonic surface, as indicated at 408.

Embodiments of the invention and subject technology described herein can provide advantages over prior RFID systems. As one example, for a FPS used for a structure, the individual cells (e.g., a fractal resonator) determine the resonance of the surface containing the plurality of cells, rather than the physical extent of collection (array) of resonators on the plasmonic surface. Thus each cell is able to convey its radiation in the near field as a surface wave (plasmonic wave) to adjacent resonators. In contrast, an antenna formed of a plain surface (or aperture) will have its resonance determined by the area and length of the surface as a continuous or contiguous current sheet. One result from the invention, therefore, is that structures can be designed with a FPS for operation at a desired operational wavelength, irrespective of the relative size of the structure to the desired operation wavelength.

Another advantage afforded by the invention is that a plasmonic surface can have 'broken' resonators (cells), but that plasmonic surface can still operate as intended as other adjacent resonators will convey the radiation to others, without a direct physical connection. The redundancy of the array operates to mitigate effects of a non-functional cell.

A further advantage afforded by the invention is that a plasmonic surface may act—though the transfer of RF energy—to not only transfer information transfer but also power, e.g., for charging, as well as heat (if desired).

Additionally, the connection to a RFID reader/transceiver can be made through attachment of or to one of the resonators of a plasmonic surface, which in turn excites the other resonators on the plasmonic surface.

In some embodiments, RFID tags and/or readers can be used which comply with (in whole or in part) any of the following technical standards, each of which is incorporated herein by reference in its entirety:

ISO 14223—Radiofrequency identification of animals—Advanced transponders

ISO/IEC 14443: This standard is a popular HF (13.56 MHz) standard for HighFlDs which is being used as the basis of RFID-enabled passports under ICAO 9303. The Near Field Communication standard that lets mobile devices act as RFID readers/transponders is also based on ISO/IEC 14443.

ISO/IEC 15693: This is also a popular HF (13.56 MHz) standard for HighFlDs widely used for non-contact smart payment and credit cards.

ISO/IEC 18000: Information technology—Radio frequency identification for item management:

Part 1: Reference architecture and definition of parameters to be standardized

Part 2: Parameters for air interface communications below 135 kHz

Part 3: Parameters for air interface communications at 13.56 MHz

Part 4: Parameters for air interface communications at 2.45 GHz

Part 6: Parameters for air interface communications at 860-960 MHz

Part 7: Parameters for active air interface communications at 433 MHz

ISO/IEC 18092 Information technology—Telecommunications and information exchange between systems—Near Field Communication—Interface and Protocol (NFCIP-1)

ISO 18185: This is the industry standard for electronic seals or "e-seals" for tracking cargo containers using the 433 MHz and 2.4 GHz frequencies.

ISO/IEC 21481 Information technology—Telecommunications and information exchange between systems—Near Field Communication Interface and Protocol-2 (NFCIP-2)

ASTM D7434, Standard Test Method for Determining the Performance of Passive Radio Frequency Identification (RFID) Transponders on Palletized or Unitized Loads ASTM D7435, Standard Test Method for Determining the Performance of Passive Radio Frequency Identification (RFID) Transponders on Loaded Containers ASTM D7580, Standard Test Method for Rotary Stretch Wrapper Method for Determining the Readability of Passive RFID Transponders on Homogenous Palletized or Unitized Loads ISO 28560-2: specifies encoding standards and data model to be used within libraries.

ISO 11784:1996, Radiofrequency identification of animals—Code structure

ISO 11785:1996, Radiofrequency identification of animals—Technical concept

Exemplary embodiments of the subject technology can utilize or include ISO 18000-6c as the tag of choice and an active tagging system that relies on existing 802.11X wireless infrastructure for active tags.

Further exemplary embodiments are also contemplated within the scope of the present disclosure. For example: A plasmonic surface RFID system can include a support surface, and a plurality of cells arranged on the support surface in close proximity to one another as a plasmonic surface and operative to plasmonically transfer RF energy. The system can include an RF transmitter or transceiver operative to produce RF energy at nominal (desired) RF frequencies—such as in the UHF, HF, or VHF frequencies including those specified by any one of the above-referenced technical standards—wherein the plasmonic surface is operative to transfer RF energy received from the RF transmitter or transceiver. At least one of the plurality of cells can be within near-field proximity (though, far-field coupling is contemplated within the scope of the present disclosure) to the RF transmitter and operative to receive RF energy from the RF transmitter. The system may optionally include a frame. The plasmonic surface can be attached to the frame. In preferred embodiments the frame (or one or more plasmonic surfaces used without a frame) can be configured as an openable enclosure, e.g., a cage, pen, or corral for an animal. At least one of the cells can be attached directly to the RF transmitter (e.g., a RFID reader or transceiver).

The frame may be configured as a shelf to receive objects having RFID tags. The frame may be configured as a wall to receive goods or materials having RFID tags. The frame may form one or more sides of a cage where RFID-tagged animals are contained or placed. The RF energy can be transferred to provide power to an RFID tag. The RFID tag can be attached to or placed on or in an object, device, or living thing.

Exemplary embodiments include a method of transferring power. The method can include placing a plasmonic surface having a plurality of cells within proximity to an RF transmitter. At least one of the cells can be within near-field proximity or connected to the RF transmitter. The RF transmitter may be a RFID reader or transceiver. The RF transmitter can transmit RF energy to the plasmonic surface having a plurality of cells. The plasmonic surface can transfer the RF energy between two or more of its plurality of cells. A RFID tag (or other RF receiver) can receive RF energy over a time period from the plasmonic surface, such that RF power is transferred to the RFID tag.

The plasmonic surface can be or include a fractal plasmonic surface.

The method can include charging a battery used by the RFID tag (or RF receiver).

Additional Exemplary Embodiments

Exemplary embodiments are directed to a novel and cost-effective method of determining near field and close to near field positions of objects and people or animals incorporating or carrying sensor systems.

Figure 5:
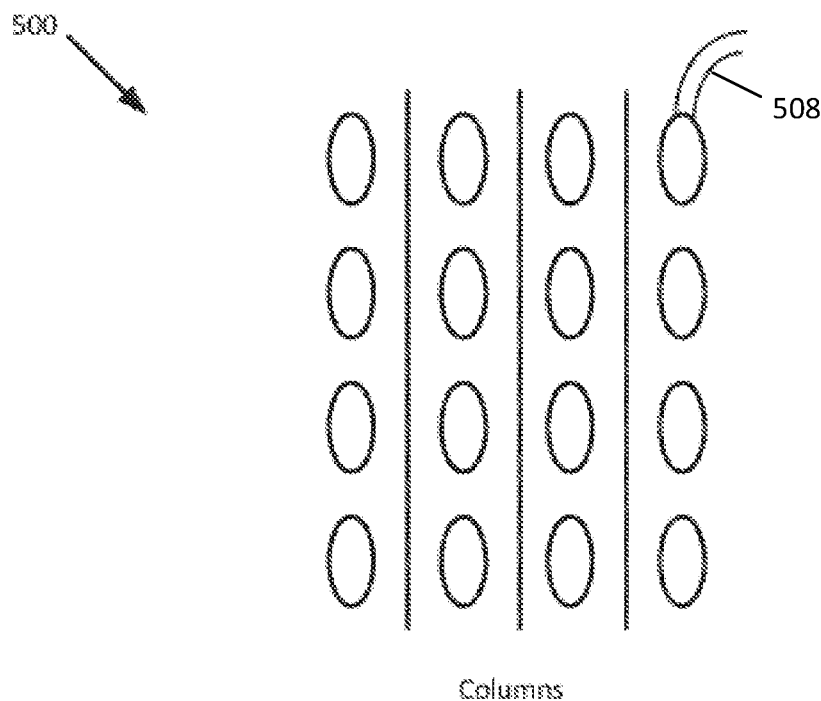
FIG. 5 depicts a system with an addressable array of resonators, with two views showing row addressing and column addressing, respectively.
Figure 5:
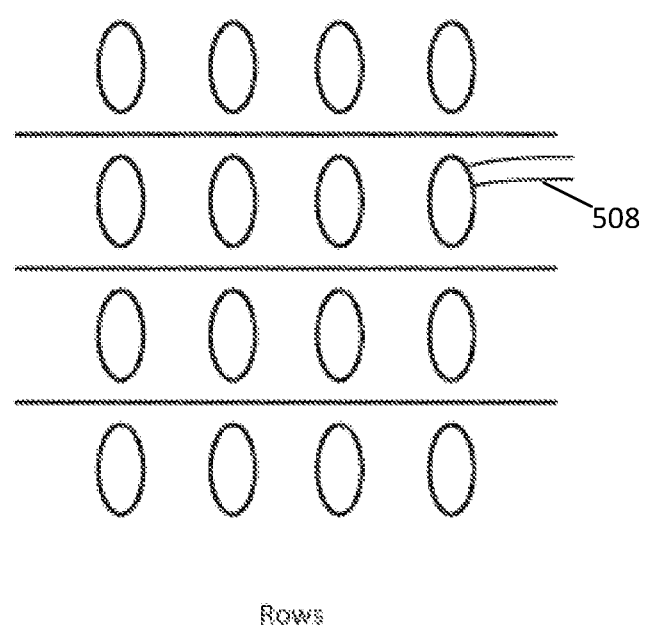

FIG. 5 depicts a system 500 with an addressable array of resonators, with two views showing row addressing and column addressing, respectively. System 500 can be used to interrogate and/or receive signals from individual or groups of resonators within the array.

System 500 is based on or includes a sheet or surface 503 (e.g., a support surface) having or populated by a plurality of resonators 502(1)-502(N), which may be referred to as an array. In exemplary embodiments, the resonators can be fractal resonators, having a fractal shape. Other shapes may be used for the resonators, including closed geometric shapes or open geometric shapes. The individual resonators are closely spaced to the adjacent resonator(s) within the array, e.g., by a distance of less than a wavelength of the radiation used for operation of the system 500. Such a separation distance can for example be $\lambda/10$ or $\lambda/20$ of a wavelength of the radiation used for the system. Of course, the system can operate over a range of operational frequencies (and wavelengths). Support surface can be made of or include any suitable material, e.g., FR4, polyimide, etc. The resonators may be made of any suitable conductive material(s). Examples include, but are not limited to, conductive paints, electroless silver or gold, sputtered conductive material(s), etc.

Representative ranges of frequencies of operation of system 500 include, but are not limited to, ranges defined by the following well-known standards, the contents of all of which are incorporated herein by reference: 3GPP, IEEE 802.11ac/ad/ah/aq/ay/ax/mc, IEEE 802.3bj, IEEE P1905.1a, IETF IPv6 Maintenance (6man), ISO/IEC/ITU MPEG-4 AVC/JVT, ITU HEVC, DVB-S2/Sx/T, ATSC NRT, ATSC A/153, OMA BOAST, RFC 5053/5445, Wi-Fi Direct, Wi-Fi P2P, Miracast, CableLabs DOCSIS 3.1, Bluetooth Core 4.0+, MoCA, HDMI, A4WP, PMA, WPC, CPRI, Global Platform TEE, Homeplug, MIPI LLI, PCISIG PCI Express, GSM, IS-54B, IS-95 and the like. Where a range of frequencies is desired or designed for a particular embodiment of system 500, a suitable separation distance can be smaller than the wavelength of operation at the highest frequency in the range, as that frequency will correspond to the shortest wavelength ($\lambda$) of the range. In exemplary embodiments, a separation distance of $\lambda/3$, $\lambda/4$, $\lambda/5$, $\lambda/6$, $\lambda/8$, $\lambda/10$, $\lambda/20$, $\lambda/25$, $\lambda/30$, $\lambda/50$, $\lambda/70$, or $\lambda/100$ can be used as the separation distance between resonators (where $\lambda$ equals a wavelength of operation of the system 500). When referring to a "range" of operation, reference is made to the 3 dB (or 50% power) bandwidth, as is well-known to a person of ordinary skill in the art. Accordingly, person of ordinary skill in the art would understand the "operational range" as indicating a range of frequencies of operation where the indicated range parameters (e.g., 3 dB or 50% power) is met. Other representative ranges include the Ka (25.6-40 GHz), Ku (12-18 GHz), and K (18 to 27 GHz) bands. Optical bands of radiation are also contemplated within the scope of the present disclosure, e.g., the NIR and far IR bands, as well as visible and UV bands. Of course other indicia of a range of frequencies may also be used as would be apparent a person of ordinary skill in the art.

This plurality of resonators has the ability to convey power (including, e.g., information about power) or electromagnetic radiation from one resonator to the next via an evanescent surface wave. Thus if one of the resonators is connected to a detection or gathering electronic unit, it is sensing or gathering from the entire array, without any direct physical connection. However, this connection, in and of itself, does not allow for determining what is gathered from a specific resonator in the plurality array. Thus, system 500 and methods of using it, can employ or provide a cost effective mechanism for determining which element or elements within the plurality array are responsible for the sensing are gathering.

As shown in FIG. 5, the plurality of resonators in the array of the system 500 works by electrically separating the array into rows and columns, and then comparing the power, information, and/or automatic radiation gathered in each row and each column. The comparison may be made by suitable processing electronics and/or controller(s) (not shown). However, breaking the plurality of the resonators in the array temporarily into rows and columns is achieved by a physical mechanism which is turned on and off temporarily. This mechanism is, or can include one or more conductive curves or lines, e.g., 504(1)-(N), 506(1)-(N) on each side of a two-sided circuit board, e.g., 503. On one side of the board 503, the curves or lines (shown as 504(1)-(3) at the top of FIG. 5) separates columns of resonators, and on the second side the curves or lines (shown as 506(1)-(3) at the bottom or FIG. 5) separate rows of resonators. Each one of these conductive curves or lines can be turned on and off (activated or decativated) by a direct current voltage applied to a diode (not shown) built into each line or curve. Thus the line or curve (e.g., 504(1) or 506(1)) is conductive when the diode has a voltage applied, and this line or curve separates, for example, a given row from its adjacent row or a given column from its adjacent column by shielding the resonator elements from each other in distinct rows or distinct columns. Despite turning on these conductive curves or lines sequentially in rows and columns one can discern which row contains most information power or lecture magnetic radiation, and then which column has the most information power and/or electrolytic radiation. Because one knows separately both the column and row information, there is a unique signature as to which resonator or resonators are gathering the information.

An advantage of the system 500 is it allows for a straightforward and simpler method of determining which resonator or resonators is closest and therefore localizes the position of the object, e.g., an animal being explored or located. For example, in a conventional system, each one of the resonators would have to be electrically connected to a detection system in order to discern which one or ones is closest to the object or animal. In this system 500 there is a marked reduction in the number of electrical connections, since only the respective edge resonator on each row and column has a direct electrical connection (galvanic or physical connection), as shown by 508. In addition conduction of the lines occurs is much more straightforward and does not require electromagnetics, but merely a DC on-off system. Thus the parts count, complexity, cost, and breakage are reduced because of the considerable number of fewer electronic connections. While FIG. 5 shows a preferred embodiment, other or alternative electrical connections for the array may be used in other embodiments.

The components of antenna systems described herein, e.g., cells of a FPS, may be made by any suitable procedure/method. In exemplary embodiments, 3D printing can be used to make the structures or components. Other suitable procedures/methods for making such component, may be used and can include computer-numeric-controlled (CNC) machining or the like. An example of a suitable 3D printer is a MakerBot Replicator Z18 3D printer made available by the MakerBot Industries LLC.

Unless otherwise indicated, the PSs and FPSs that have been discussed herein may be implemented (e.g., designed and/or manufactured) with a computer system configured to perform the functions that have been described herein for the component. Each computer system can include one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system for the design and/or manufacture of the above-noted antenna components may be a desktop computer or a portable computer, such as a laptop computer, a notebook computer, a tablet computer, a PDA, a smartphone, or part of a larger system, such a vehicle, appliance, and/or telephone system.

A single computer system may be shared by the multiple users or CNC machines for such design and/or manufacturing processes.

Each computer system for the design and/or manufacturing processes may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/ or advantages. These also include embodiments in which the components and/or steps are arranged and/or ordered differently.

For example, while certain fractal shapes have been described above, others may be used. Also, fractal shapes can be used that have any suitable order (level of iteration of the generator shape). For further example, while certain context has been provided above for use of the disclosed antennas at certain RF frequencies or wavelengths, other frequencies and wavelengths of electromagnetic energy may be used within the scope of the present disclosure.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A fractal plasmonic surface (FPS) radio-frequency identification (RFID) system, the system comprising:
   a cage including frame with a plurality of faces;
   a plurality of close packed fractal cells disposed on a supporting surface disposed on one face of the plurality of faces, wherein a sub-plurality of fractal cells are disposed along edges of the one face, wherein each fractal cell includes a fractal shape defining an electrical resonator, wherein the plurality of fractal cells are positioned sufficiently close to one another to support plasmonic transfer of energy between the fractal cells, and wherein the plurality of close packed cells are not galvanicaly connected to one another; and
   at least one RFID tag configured for application to an animal placed within the cage;
   wherein the resonator system is operative as a reader antenna for the RFID system to both receive RF energy from and transmit RF energy to the at least one RFID tag on the animal inside the cage; and
   wherein, for transferring the RF energy during operation, galvanic attachment to the reader is only at the fractal cells of the sub-plurality of fractal cells disposed along edges of the one face.

2. The system of claim 1, whereby resonant lines separate rows and columns of the fractal cells thereby activating maximum RFID readability within a given row or column, and whereby said resonant lines are configured to be turned on and off via a mechanical or electrical switching system.

3. The system of claim 1, whereby resonant conductive lines separate rows and columns of the fractal cells thereby activating maximum RFID readability within a given row or column, and whereby said resonant lines are configured to be turned on and off via a mechanical or electrical switching system, and said switching system works separately through switching of each row and column, thereby allowing an estimate of the specific fractal cell in closest proximity to the implanted RFID chip.

4. An RFID reader coupled to the resonator system of claim 2.

5. An RFID reader coupled to the resonator system of claim 3.

* * * * *